United States Patent
Okada (10) Patent No.: US 10,698,634 B2
(45) Date of Patent: Jun. 30, 2020

(54) COMPUTER SYSTEM AND DATA CONTROL METHOD UTILIZING NVME AND STORING COMMANDS INCLUDING AN OFFSET ADDRESS CORRESPONDING TO A SERVER IN A QUEUE

(71) Applicant: Hitachi, Ltd., Tokyo (JP)

(72) Inventor: Takashi Okada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 77 days.

(21) Appl. No.: 16/083,899

(22) PCT Filed: May 26, 2016

(86) PCT No.: PCT/JP2016/065532
§ 371 (c)(1),
(2) Date: Sep. 11, 2018

(87) PCT Pub. No.: WO2017/203645
PCT Pub. Date: Nov. 30, 2017

(65) Prior Publication Data
US 2019/0073160 A1    Mar. 7, 2019

(51) Int. Cl.
*G06F 3/06* (2006.01)
*G06F 13/16* (2006.01)
(Continued)

(52) U.S. Cl.
CPC .......... *G06F 3/0659* (2013.01); *G06F 3/0604* (2013.01); *G06F 3/0611* (2013.01);
(Continued)

(58) Field of Classification Search
CPC .... G06F 3/0604; G06F 3/0611; G06F 3/0659; G06F 3/0673; G06F 3/0679; G06F 12/10;
(Continued)

(56) References Cited

U.S. PATENT DOCUMENTS

| 2010/0082874 | A1 | 4/2010 | Baba et al. |
| 2015/0324118 | A1 | 11/2015 | Mccambridge et al. |
| 2016/0352831 | A1* | 12/2016 | Totolos ................. G06F 3/0688 |

FOREIGN PATENT DOCUMENTS

| JP | 2007-148621 A | 6/2007 |
| JP | 2008-021252 A | 1/2008 |

(Continued)

OTHER PUBLICATIONS

International Search Report of PCT/JP2016/065532 dated Jul. 5, 2016.

*Primary Examiner* — Larry T Mackall
(74) *Attorney, Agent, or Firm* — Mattingly & Malur, PC (57) ABSTRACT

A driver of a server converts an address of a memory included in the server into an offset address on the basis of an offset value corresponding to the server and stores a command including the offset address in a queue. A storage device acquires the command from the queue of the server and issues an access request to the offset address included in the acquired command. An intermediate device traps the access request issued from the storage device, specifies a server on the basis of the offset address included in the trapped access request, resets the offset address to an original address on the basis of an offset value corresponding to the specified server, and transfers the access request including the reset address to the specified server.

8 Claims, 10 Drawing Sheets

(51) Int. Cl.
  *G06F 13/38*  (2006.01)
  *G06F 13/28*  (2006.01)
  *G06F 13/36*  (2006.01)
  *G06F 12/10*  (2016.01)

(52) U.S. Cl.
  CPC .......... *G06F 3/0673* (2013.01); *G06F 3/0679* (2013.01); *G06F 12/10* (2013.01); *G06F 13/1605* (2013.01); *G06F 13/1673* (2013.01); *G06F 13/28* (2013.01); *G06F 13/36* (2013.01); *G06F 13/38* (2013.01); *G06F 2212/1016* (2013.01); *G06F 2212/202* (2013.01)

(58) Field of Classification Search
  CPC .. G06F 13/1605; G06F 13/1673; G06F 13/28; G06F 13/36; G06F 13/38; G06F 2212/1016; G06F 2212/202
  See application file for complete search history.

(56) References Cited

FOREIGN PATENT DOCUMENTS

| | | |
|---|---|---|
| JP | 2010-079816 A | 4/2010 |
| JP | 2012-113604 A | 6/2012 |

\* cited by examiner

COMPUTER SYSTEM AND DATA CONTROL METHOD UTILIZING NVME AND STORING COMMANDS INCLUDING AN OFFSET ADDRESS CORRESPONDING TO A SERVER IN A QUEUE

TECHNICAL FIELD

The present invention relates to data control in a computer system.

BACKGROUND ART

In a computer system in which a plurality of servers share a storage device, as a technique for allocating IO (Input/Output) between the servers and the storage device, a technique explained below is known. The computer system includes the servers, an IO hub, an IO card connected to the IO hub, and a switch to which the servers and the IO hub are connected. The servers are set to be capable of occupying and using the IO card. The IO hub allocates a virtual MMIO (Memory Mapped Input/Output) address peculiar to a server to a physical MMIO address corresponding to the IO card, retains allocation information indicating a relation among the allocated virtual MMIO address, the physical MMIO address, and a server identifier, and, when an access request to the IO card is transmitted from the server, refers to the allocation information, extracts the server identifier from the access request, and identifies the server at an access request source. Further, the IO hub converts a DMA (Direct Memory Access) address included in a DMA request from the IO card into an address corresponding to an identified server at a DMA request source, and transfers the DMA request transmitted from the IO card to a memory space of the server on the basis of the converted address (PTL 1 and PTL 2).

CITATION LIST

Patent Literature

PTL 1: Japanese Patent Application Laid-Open No. 2008-21252
PTL 2: Japanese Patent Application Laid-Open No. 2007-148621

SUMMARY OF INVENTION

Technical Problem

However, when the conventional technology is applied to a computer system including a storage device adapted to NVMe (Non-Volatile Memory Express), IO performance of the storage device cannot be sufficiently exerted. A reason for this is explained below.

In the specifications of the NVMe, a command including a memory address of a server at a DMA destination is stored in a memory of the server. The storage device issues a read request to the memory of the server to thereby fetch the command and sets the command in an address register on the inside. In the specifications of the NVMe, when a designated plurality of server addresses do not fit in one command, the storage device fetches memory addresses of servers in a list form one after another. In such a configuration, it is difficult to convert a DMA address included in a DMA request into an address corresponding to the request source server on the IO hub as in the conventional technique. This is because the DMA address that the IO hub has to convert is included in completion to the read request issued by the storage device and the IO hub has to determine whether the read request delivered by the storage device is data transfer of an IO operation or is equivalent to command fetch. To realize such determination on the IO hub, a mechanism of the IO hub is complicated and an increase in latency is caused.

Therefore, an object of the present invention is to realize, with a relatively simple mechanism, a computer system in which a plurality of servers share a storage device adapted to NVMe and prevent an increase in latency.

Solution to Problem

A computer system according to an embodiment includes: a storage device adapted to NVMe; an intermediate device connected to the storage device; and a plurality of servers connected to the intermediate device.

Each of the servers includes: a driver related to the storage device; and a queue in which a command to the storage device is stored.

The driver of the server converts an address of a memory included in the server into an offset address on the basis of an offset value corresponding to the server and stores a command including the offset address in the queue.

The storage device acquires the command from the queue of the server and issues an access request to the offset address included in the acquired command.

The intermediate device traps the access request issued from the storage device, specifies a server on the basis of the offset address included in the trapped access request, resets the offset address to an original address on the basis of an offset value corresponding to the specified server, and transfers the access request including the reset address to the specified server.

Advantageous Effects of Invention

According to the present invention, it is possible to realize, with a relatively simple mechanism, a computer system in which a plurality of servers share a storage device adapted to NVMe and to prevent an increase in latency.

DESCRIPTION OF EMBODIMENT

An embodiment is explained below.

In the following explanation, information is sometimes explained using representation "xxx table", "xxx queue", or "xxx list". However, the information may be represented in any data structure. That is, the "xxx table", the "xxx queue", or the "xxx list" can be called "xxx information" to indicate that the information does not depend on the data structure.

In the following explanation, processing is sometimes explained using a "program" as a subject. However, the program is executed by a processor (e.g., a CPU (Central Processing Unit)) to perform decided processing while using at least one of a storage resource (e.g., a memory) and a communication interface device as appropriate. Therefore, the subject of the processing may be the processor or a device including the processor. Apart of or the entire processing performed by the processor may be performed by a hardware circuit. A computer program may be installed from a program source. The program source may be a program distributing server or a storage medium (e.g., a portable storage medium).

In the following explanation, when elements of the same type are distinguished and explained, reference signs are sometimes used as in "server 4A" and "server 4B". When the elements of the same type are explained without being distinguished, only a common number of the reference signs is sometimes used as in "server 4".

Note that, in the embodiment explained below, the embodiment is divided into a plurality of sections or embodiments and explained when necessary for convenience. However, the plurality of sections or embodiments are not unrelated to one another except, in particular, when it is clearly indicated that the plurality of sections or embodiments are unrelated. The plurality of sections or embodiments are in a relation in which one is a part or all of modifications, details, supplementary explanations, or the like of the other.

In the embodiment explained below, when the numbers (including the numbers of pieces, numerical values, amounts, and ranges) of elements are referred to, the numbers are not limited to specific numbers of the elements and may be equal to or larger than the specific numbers except, in particular, for example, when it is clearly indicated that the numbers are limited to the specific numbers and when the numbers are clearly limited to the specific numbers.

Further, in the embodiment explained below, constituent elements (including element steps) are not always essential except, in particular, for example, when it is clearly indicated that the constituent elements are essential and when the constituent elements are clearly considered to be essential in principle.

Figure 1:
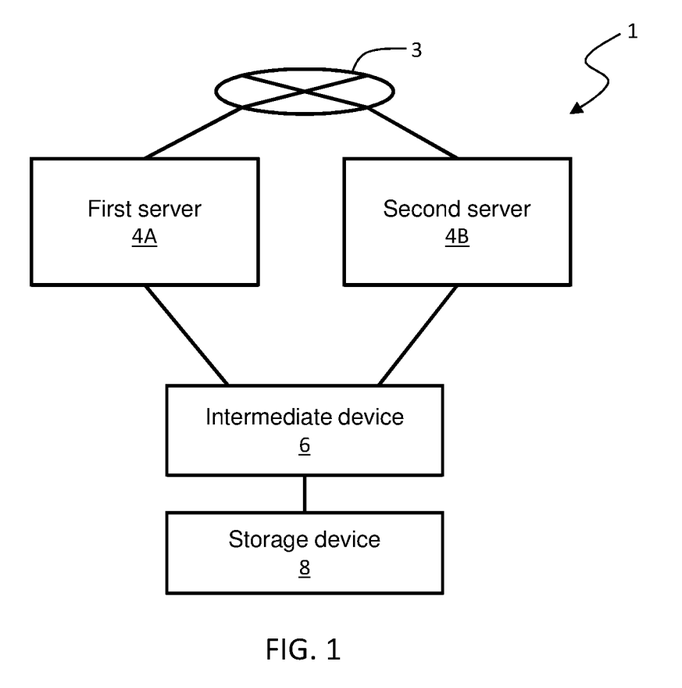
FIG. 1 shows a configuration example of a computer system.

FIG. 1 shows a configuration example of a computer system 1 according to the embodiment.

The computer system 1 includes a plurality of servers 4 (a first server 4A and a second server 4B), an intermediate device 6, and a storage device 8. An example of the storage device 8 is an SSD (Solid State Drive) adapted to NVMe. The intermediate device 6 and the storage device 8 may be provided in plural.

The first server 4A and the second server 4B are bidirectionally communicable via a predetermined network 3. Examples of the network 3 include a WAN (Wide Area Network), a LAN (Local Area Network), and a VPN (Virtual Private Network).

The first server 4A and the second server 4B are bidirectionally communicably connected to the intermediate device 6. A scheme of the connection may be PCIe (PCI-Express).

The intermediate device 6 is bidirectionally communicably connected to the storage device 8. A scheme of the connection may be PCIe. Details of the intermediate device 6 are explained below (see FIG. 3).

Figure 2:
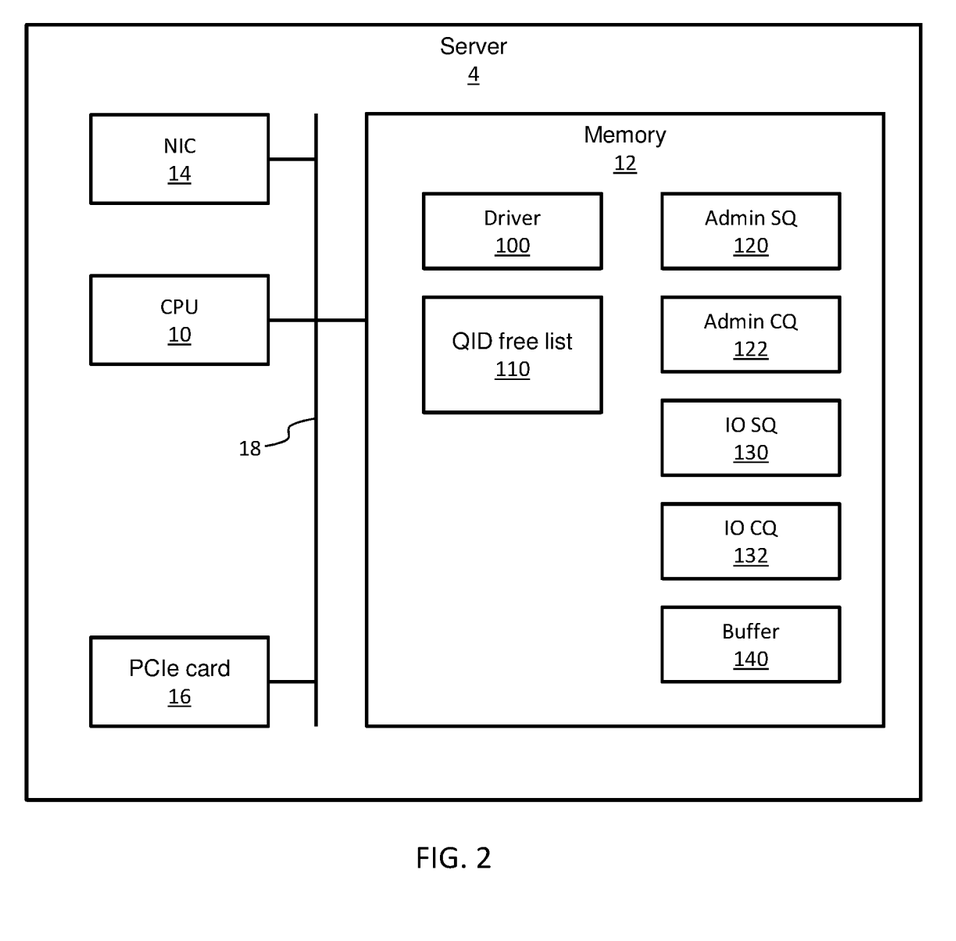
FIG. 2 shows a configuration example of a server.

FIG. 2 shows a configuration example of the server 4.

The server 4 includes a CPU 10, a memory 12, a PCIe card 16, and a NIC (Network Interface Card) 14. These components may be connected by a bidirectionally communicable internal bus 18. These components may be respectively provided in plural.

The NIC 14 controls data related to IP transmitted and received by the server 4 via the network 3.

The PCIe card 16 controls data related to PCIe transmitted to and received from the intermediate device 6 by the server 4. The PCIe card 16 may include a plurality of PCIe ports.

The CPU 10 reads out programs and data from the memory 12 and processes the programs and the data to thereby realize various functions of the server 4.

Programs and data are stored in the memory 12. Examples of the memory 12 include a DRAM (Dynamic Random Access Memory), a MRAM (Magnetoresistive Random Access Memory), and a FeRAM (Ferroelectric Random Access Memory).

A device driver (represented as "driver") 100 may be stored in the memory 12 as a program. The driver 100 provides a function for an application of the server 4 to access the storage device 8. Operation mainly performed by the server 4 in the explanation in this embodiment may be mainly performed by the driver 100 of the server 4 or may be mainly performed by the CPU 10 that executes the driver 100.

A QID free list 110 may be stored in the memory 12 as data. The QID free list 110 has an ID of an unallocated (i.e., allocatable) queue (referred to as "QID"). The QID free list 110 may be represented as queue ID management information as well.

A queue related to the NVMe may be configured in the memory 12. Examples of the queue include an Admin Submission Queue (referred to as "Admin SQ") 120, an Admin Completion Queue ("Admin CQ") 122, an IO Submission queue (referred to as "IO SQ") 130, and an IO Completion Queue (referred to as "IO CQ") 132.

A buffer 140 may be secured in the memory 12 according to necessity. In the buffer 140, write data to the storage device 8, read data from the storage device 8, or the like may be stored.

Figure 3:
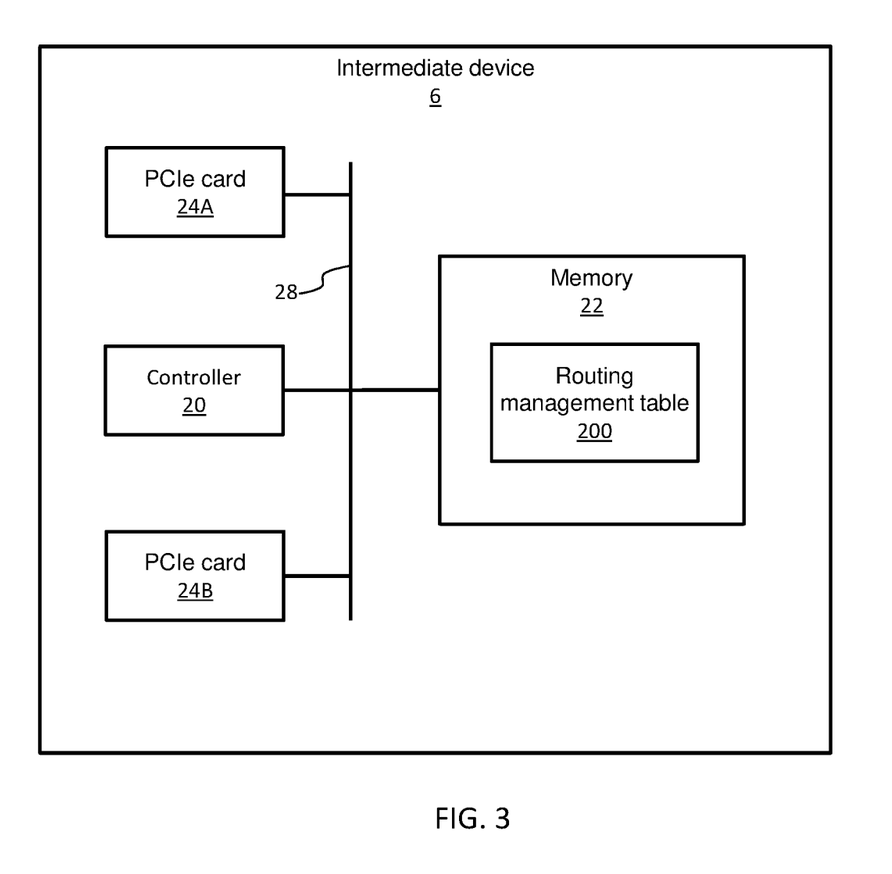
FIG. 3 shows a configuration example of an intermediate device.

FIG. 3 shows a configuration example of the intermediate device 6.

The intermediate device 6 includes a controller 20, a memory 22, and PCIe cards 24A and 24B. These components may be connected by a bidirectionally communicable internal bus 28. The components may be respectively provided in plural.

The PCIe card 24A controls data related to PCIe transmitted to and received from the server 4 by the intermediate device 6. The PCIe card 24B controls data related to PCIe transmitted to and received from the storage device 8 by the intermediate device 6. Pluralities of PCIe ports may be provided in the PCIe cards 24.

The controller 20 realizes various functions of the intermediate device 6. Operation mainly performed by the intermediate device 6 in this embodiment may be mainly performed by the controller 20 of the intermediate device 6.

A routing management table 200 may be stored in the memory 22 as data. Details of the routing management table 200 are explained below (see FIG. 4).

Figure 4:
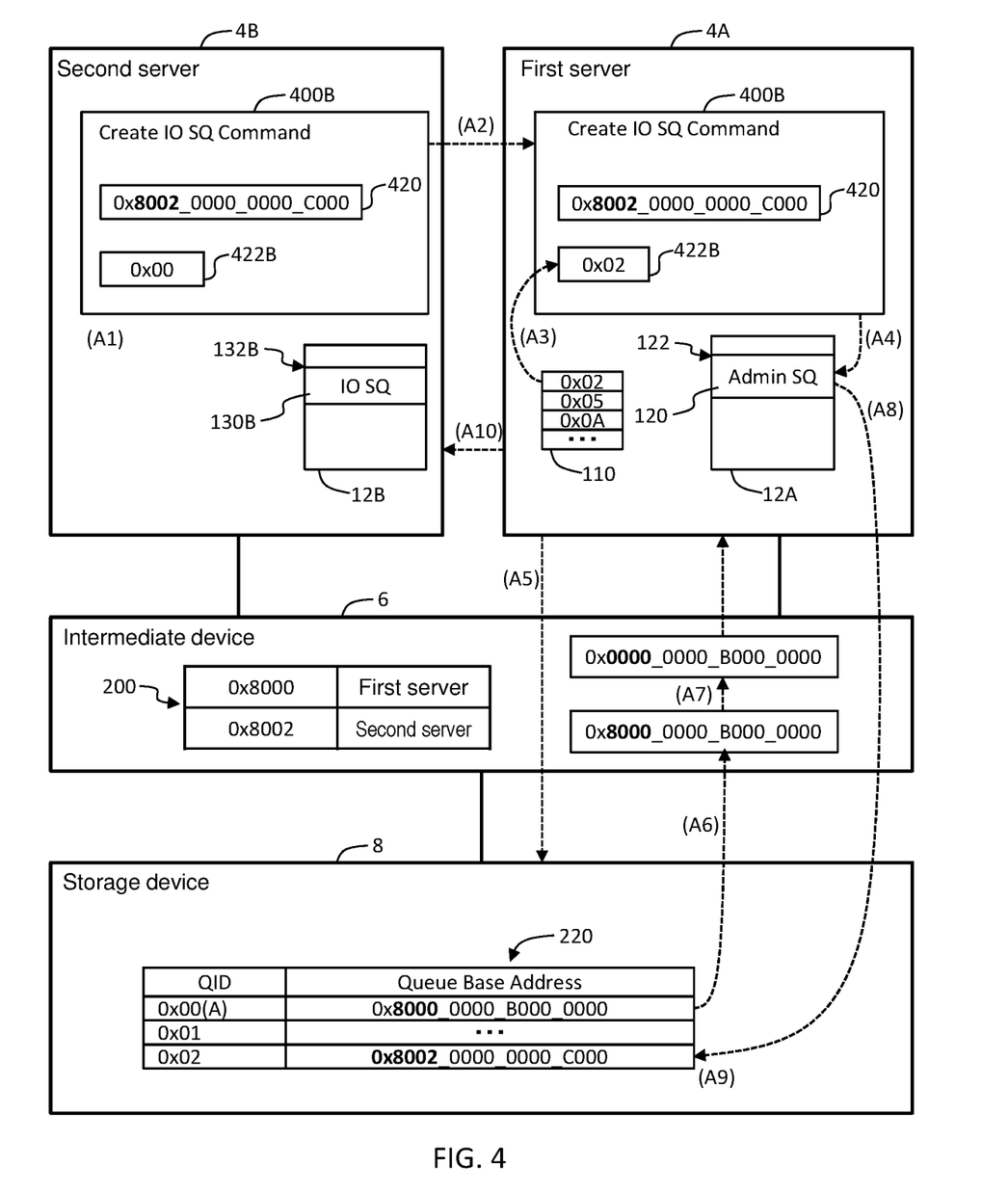
FIG. 4 shows an overview of IO queue generation processing.
Figure 5:
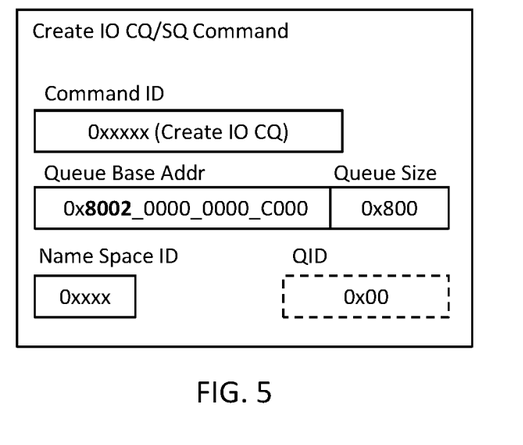
FIG. 5 shows a configuration example of an IO queue generation command.

FIG. 4 shows an overview of IO queue generation processing. FIG. 5 shows a configuration example of an IO queue generation command.

The server 4 needs to generate an IO queue in the memory 12 in order to exchange an IO command with the storage device 8 adapted to the NVMe. A command for generating the IO queue is the IO queue generation command.

As shown in FIG. 5, a command ID, a queue-base address, a queue size, a Name Space ID, and a QID (Queue ID) may be included in the IO queue generation command.

The command ID is an ID for identifying the command. In the command ID, an ID corresponding to a "Create IO SQ Command", an ID corresponding to a "Create IO CQ Command", and the like in the NVMe specifications are stored.

The queue-base address indicates a leading address 132 of the IO queue 130 generated in the memory 12.

The queue size indicates a size of the IO queue generated in the memory 12.

The Name Space ID is an ID for identifying a Name Space at an issue destination of the command.

The QID is an ID for uniquely identifying the IO queue generated in the memory 12.

The server 4 can exchange IO data with the storage device 8 by generating the IO queue in the memory 12 and issuing the IO generation command to the storage device 8. The issuance of the IO queue generation command to the storage device 8 is performed through the Admin SQ. However, in the NVMe specifications, the storage device 8 manages only one Admin SQ. Therefore, the plurality of servers 4 cannot respectively generate Admin SQs.

Therefore, in the computer system 1 according to this embodiment, one server among the plurality of servers 4 representatively has a configuration for issuing the IO queue generation command to the storage device 8. In the following explanation, an overview of processing for generating an IO queue in the second server 4B when the first server 4A is a representative server and the second server 4B is a server other than the representative server is explained with reference to FIG. 4.

(A1) The driver 100 of the second server 4B generates a "Create IO SQ Command" 400B. At this time, the driver 100 of the second server 4B may store, in a queue-base address 420 of the "Create IO SQ Command" 400B, an address (referred to as "offset address") obtained by adding an offset value associated with the second server 4B to a queue-base address 132B of an IO SQ 130B generated in a memory 12B of the second server 4B. Note that an offset value capable of uniquely identifying each of the servers may be associated with the server.

In an example shown in FIG. 4, "0x0000_0000_0000_C000" is equivalent to the queue-base address 132B of the IO SQ 130B generated in the memory 12B. "0x8002_0000_0000_0000" is equivalent to the offset value associated with the second server 4B. "0x8002_0000_0000_C000" is equivalent to an offset address obtained by adding up the queue-base address 132B and the offset value. In this embodiment, the offset value is sometime represented by only a leading address (0x8002). The real queue-base address 132B of the IO SQ 130B generated in the memory 12B may be represented as "a real address of a queue" and an offset address obtained by adding the offset value to the real address may be represented as "an offset address of a queue".

In this embodiment, an offset value to be added to or subtracted from high-order 16 bits of a memory space of 64 bits is used. However, the offset value may be any value as long as the offset value does not overlap a physically implemented memory area.

The driver 100 of the second server 4B may store a dummy QID (e.g., "0x00") in a QID 422B of the "Create IO SQ Command" 400B. In this case, a regular QID is given by a first server, which is a representative server.

(A2) The driver 100 of the second server 4B requests the first server 4A, which is the representative server, to issue the generated "Create IO SQ Command" 400B. At this time, the driver 100 of the second server 4B may directly transmit the "Create IO SQ Command" 400B to the first server 4A or may transmit an issue request for a command including content of the "Create IO SQ command" to the first server 4A.

(A3) When receiving the "Create IO SQ Command" 400B from the second server 4B, the driver 100 of the first server 4A allocates one of QIDs in the QID free list 110 to the "Create IO SQ Command" 400B. In the example shown in FIG. 4, the dummy QID 422B "0x00" is replaced with a QID "0x02" in the QID free list 110.

(A4) The driver 100 of the first server 4A enqueues the "Create IO SQ Command" 400B to the Admin SQ 120 of a memory 12A of the first server 4A.

(A5) The driver 100 of the first server 4A updates a Doorbell register related to the Admin SQ 120 of the storage device 8.

(A6) When detecting the update of the Doorbell register related to the Admin SQ 120 in (A4), the storage device 8 issues a read request for fetching the "Create IO SQ Command" 400B from the Admin SQ 120 of the first server 4A. At this time, the storage device 8 may include, in the read request, an offset address of the Admin SQ 120. The offset address of the Admin SQ 120 may be an address obtained by adding an offset value (0x8000) associated with the first server 4A to a real address of the Admin SQ 120 of the first server 4A. The offset address of the Admin SQ 120 is communicated to the storage device 8 and registered in an internal register 220 of the storage device 8 when the first server 4A generates the Admin SQ 120.

(A7) The intermediate device 6 traps the read request issued from the storage device 8. The intermediate device 6 refers to the routing management table 200 and specifies from the offset value (0x8000) of the offset address included in the read request that a routing destination of the read request is the first server 4A. The intermediate device 6 converts the offset address of the read request into a real address and transfers the real address to the first server 4A. The converting the offset address into the real address may be subtracting the offset value from the offset address or may be setting the offset value of the offset address to "NULL". The same applies to other kinds of conversion.

(A8) The first server 4A receives the read request in (A7) and returns the "Create IO SQ Command" 400B in the Admin SQ 120 stored in the real address included in the read request to the storage device 8.

(A9) The storage device 8 acquires the "Create IO SQ Command" 400B in (A8) and registers the QID and the offset address included in the command in the internal register 220 in association with each other. As explained above, the offset address is an address obtained by adding the offset value (0x8002) associated with the second server 4B to the real address 132B of the IO SQ 130 generated in the memory 12B of the second server 4B.

(A10) Note that the driver 100 of the first server 4A may notify the QID given to the dummy QID of the "Create IO SQ Command" of the second server 4B to the second server 4B at predetermined timing. The driver 100 of the first server 4A may notify the QID, for example, at timing when "Command Completion" corresponding to the "Create IO SQ Command" is received or timing after the execution of (A3) explained above.

According to the processing explained above, an offset address of an IO queue generated in the memory of the server other than the representative server can be registered in the storage device 8. Note that, when an offset address of an IO queue generated in the memory of the representative server is registered in the storage device 8, the representative server only has to generate a "Create IO SQ Command" including the offset address and enqueue the "Create IO SQ Command" to the Admin SQ 120 of the memory of the representative server. In the above explanation, the "Create IO SQ Command" is explained. However, the same applies to the "Create IO CQ Command" and the like.

Figure 6:
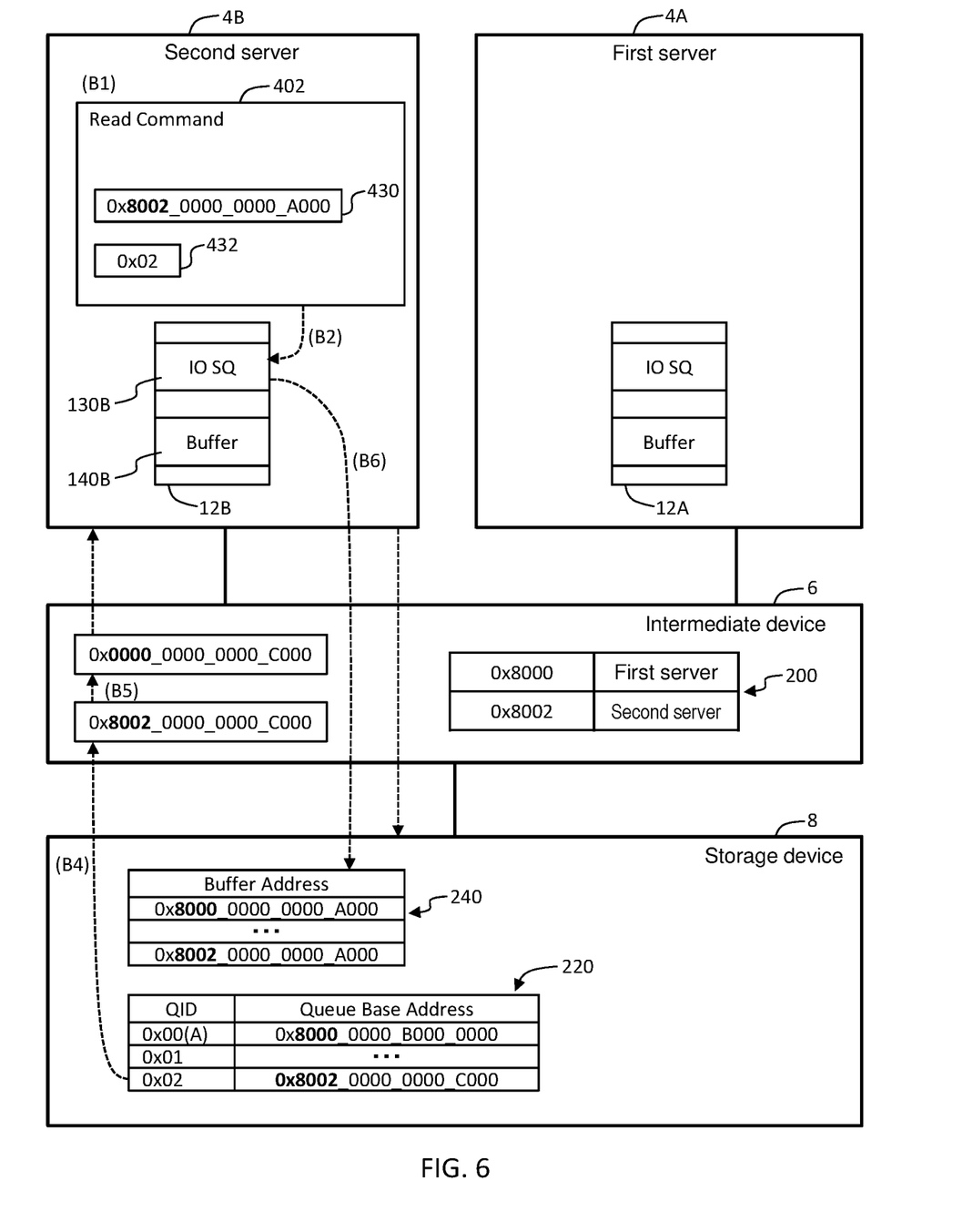
FIG. 6 shows an overview of IO command issue processing.

FIG. 6 shows an overview of IO command issue processing.

The server 4 enqueues an IO command to the IO queue generated in the memory 12 to thereby issue an IO command to the storage device 8 adapted to NVMe. Examples of the IO command include a "Write Command" and a "Read Command" in the NVMe specifications.

In the following explanation, an overview of processing in which the second server 4B, which is the server other than the representative server, issues a "Read Command" is explained with reference to FIG. 6. Note that the processing explained below is the same when a "Write Command" is issued.

(B1) The driver 100 of the second server 4B generates a "Read Command" 402. At this time, the driver 100 of the second server 4B may include, in the "Read Command" 402, an offset address 430 obtained by adding the offset value (0x8002) associated with the second server 4B to a base address of a buffer 140B secured for Read data storage in the memory 12B of the second server 4B.

In an example shown in FIG. 6, "0x0000_0000_0000_A000" is equivalent to the base address of the buffer 140B secured in the memory 12B and "0x8002_0000_0000_A000" is equivalent to the offset address 430 of the buffer to which the offset value is added. The real base address of the buffer 140B secured in the memory 12B may be represented as "a real address of a buffer" and the address obtained by adding the offset value to the base address of the buffer 140B may be represented as "an offset address of a buffer". The driver 100 of the second server 4B may include, in the "Read Command" 402, a QID 432 (in the example shown in FIG. 6, "0x02") corresponding to the IO SQ 130B of the second server 4B.

(B2) The driver 100 of the second server 4B enqueues the generated "Read Command" 402 to the IO SQ 130B of the memory 12B of the second server 4B.

(B3) The driver 100 of the second server 4B updates a Doorbell register related to the IO SQ 130B of the second server 4B of the storage device 8.

(B4) When detecting the update of the Doorbell register related to the IO SQ 130B in (B3), the storage device 8 issues a read request for fetching the "Read Command" 402 from the IO SQ 130B of the second server 4B. At this time, the storage device 8 may include, in the read request, an offset address of the IO SQ 130B. The offset address of the IO SQ 130B may be an address obtained by adding the offset value (0x8002) associated with the second server 4B to a real address of the IO SQ 130B of the second server 4B. The offset address of the IO SQ 130B may be communicated to the storage device 8 when the second server 4B generates the IO SQ 130B and registered in the internal register 220 of the storage device 8.

(B5) The intermediate device 6 traps the read request issued from the storage device 8. The intermediate device 6 refers to the routing management table 200 and specifies from the offset value (0x8002) of the offset address included in the read request that a routing destination of the read request is the second server 4B. The intermediate device 6 converts the offset address of the read request into a real address and transfers the real address to the second server 4B.

(B6) The second server 4B receives the read request in (B5) and returns a "Read Command" 402B in the IO SQ 130 stored in the real address included in the read request to the storage device 8. Processing after this processing is explained below with reference to FIG. 7.

Figure 7:
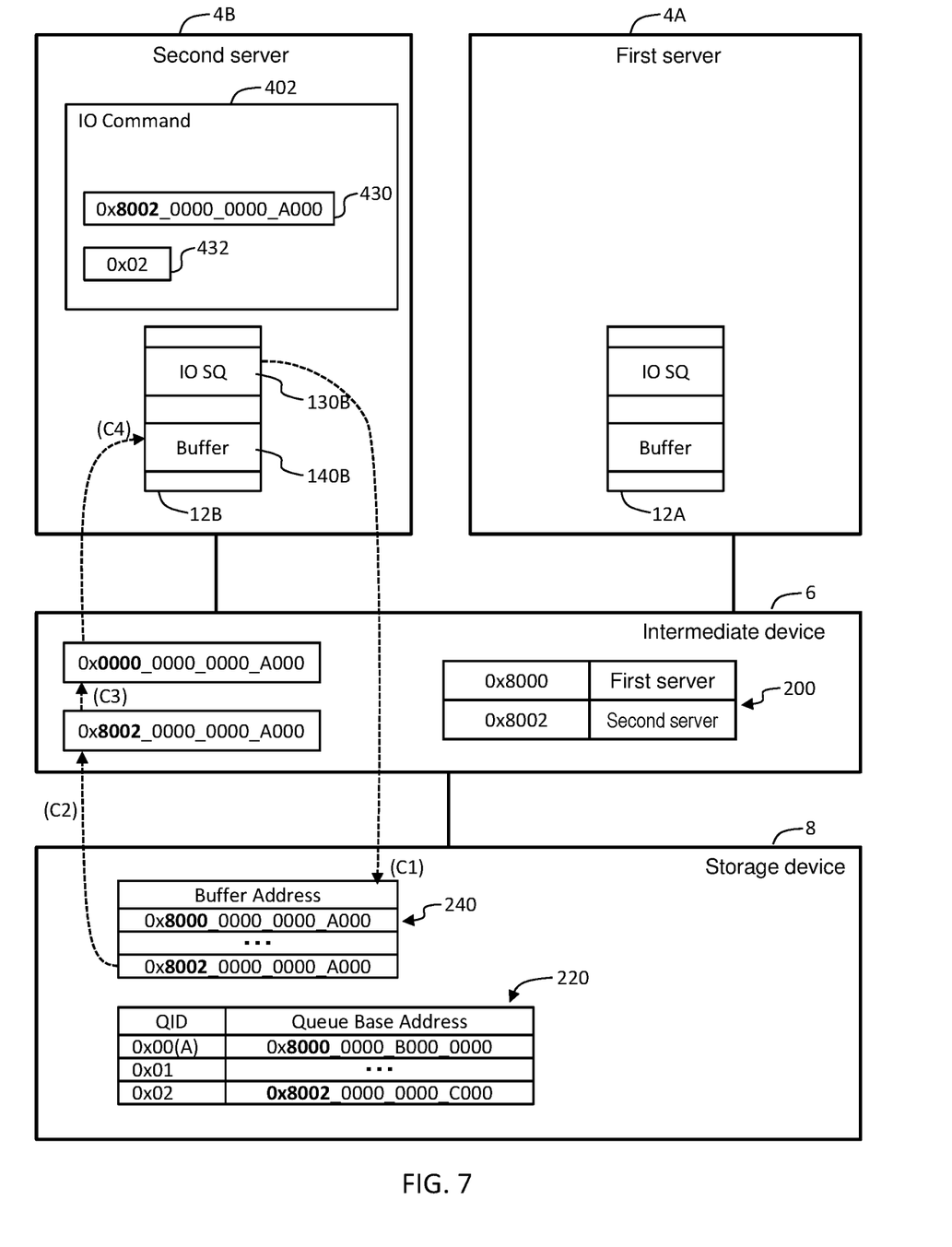
FIG. 7 shows an overview of IO command execution processing.

FIG. 7 shows an overview of IO command execution processing.

Following FIG. 6, the processing performed when an IO command is the "Read Command" is explained.

(C1) The storage device 8 acquires the "Read Command" 402B in (B6) explained above and registers an offset address of the buffer 140B included in the "Read Command" 402B in the internal register 240.

(C2) The storage device 8 delivers read data to the offset address of the buffer 140B.

(C3) The intermediate device 6 traps the read data delivered from the storage device 8. The intermediate device 6 refers to the routing management table 200 and specifies from the offset value (0x8002) in the offset address of the buffer 140B, which is a destination of the read data that a routing destination is the second server 4B. The intermediate device 6 converts the destination of the read data from the offset address of the buffer 140B into a real address and transfers the real address to the second server 4B.

(C4) The transferred read data is written in the real address of the buffer 140B at the destination.

Note that, when the IO command is a "Write Command", write data stored in the buffer 140B is transferred to and written in the storage device 8.

According to the processing explained above, the driver 100 of the second server 4B can read data from the storage device 8 and write data in the storage device 8.

Figure 8:
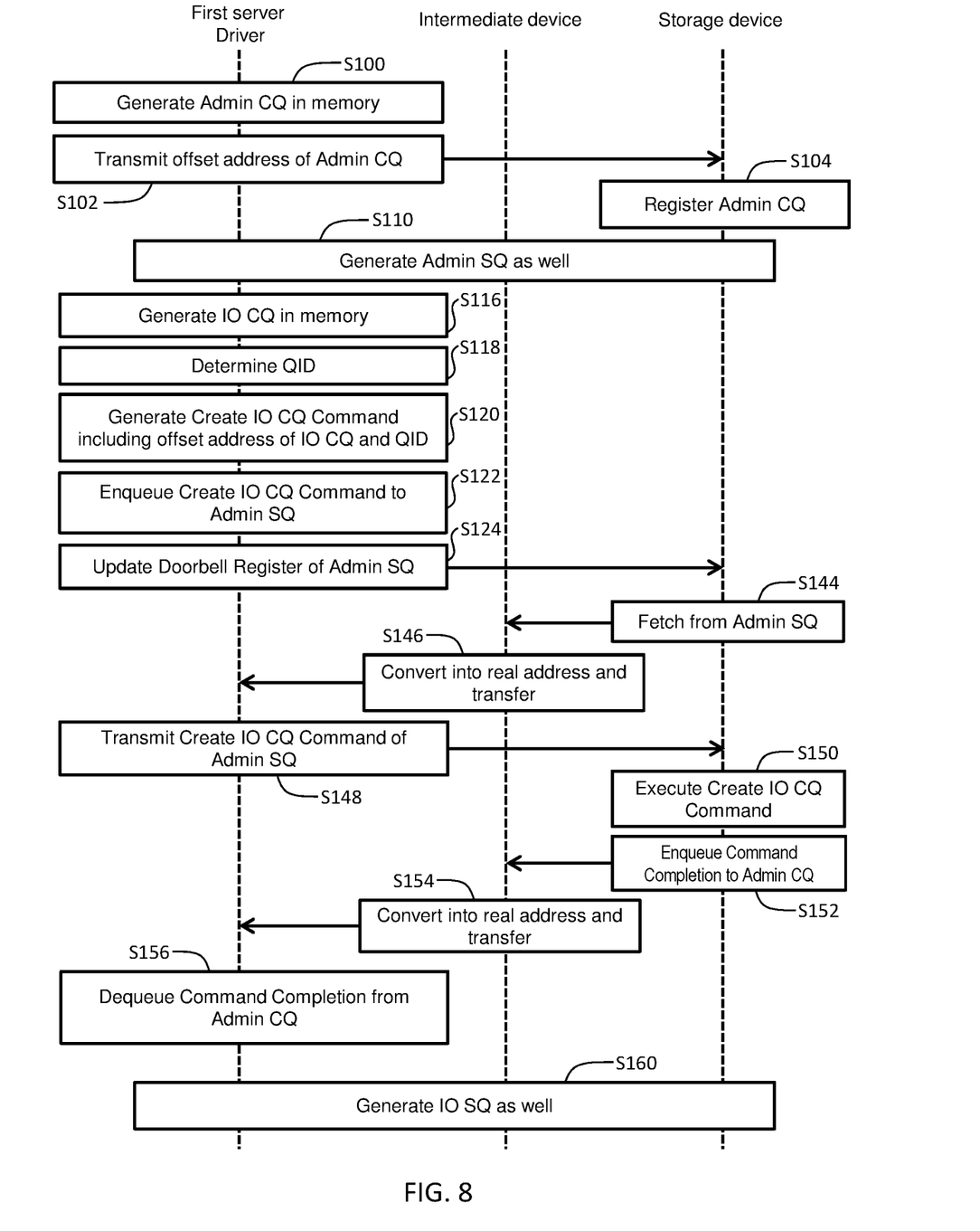
FIG. 8 is a flowchart showing an example of initial setting processing for a representative server.

FIG. 8 is a flowchart showing an example of initial setting processing for the representative server.

According to the initial setting processing, the first server 4A, which is the representative server, generates the Admin SQ 120 and the Admin CQ 122 and the IO SQ 130 and the IO CQ 132 in the memory 12A of the first server 4A. Details are explained below.

The driver 100 of the first server 4A generates the Admin CQ 122 in the memory 12A (S100).

The driver 100 of the first server 4A adds the offset value (0x8000) associated with the first server 4A to a real address of the generated Admin CQ 122 and calculates an offset address of the Admin CQ 122. The driver 100 of the first server 4A transmits the offset address of the Admin CQ 122 to the storage device 8 (S102).

The storage device 8 registers the transmitted offset address of the Admin CQ 122 in the internal register 220 (S104).

The driver 100 of the first server 4A and the storage device 8 execute, concerning the Admin SQ 120, the same processing as S100 and S102 explained above (S110).

The driver 100 of the first server 4A generates the IO CQ 132 in the memory 12B (S116).

The driver 100 of the first server 4A selects one QID out of the QID free list 110. The driver 100 of the first server 4A deletes the selected QID from the QID free list 110 (S118).

The driver 100 of the first server 4A adds the offset value (0x8000) associated with the first server 4A to a real address of the generated IO CQ 132 and calculates an offset address of the IO CQ 132. The driver 100 of the first server 4A generates a "Create IO CQ Command" including the calculated offset address and the QID selected in S118 (S120).

The driver 100 of the first server 4A enqueues the generated "Create IO CQ Command" to the Admin SQ 120 (S122).

The driver 100 of the first server 4A updates the Doorbell register related to the Admin SQ 120 in the storage device 8 (S124). A Tail address at this time may be an address to which the offset address is added. The same applies to update of other Doorbell registers.

When detecting the update of the Doorbell register, the storage device 8 issues a read request for fetching the "Create IO CQ Command" from the Admin SQ 120 (S144).

The intermediate device 6 traps the read request in S144 issued from the storage device 8. The intermediate device 6 refers to the routing management table 200 and specifies that the offset value (0x8000) of the offset address included in the read request is associated with the first server 4A. The intermediate device 6 converts the offset address into a real address. For example, the intermediate device 6 subtracts the offset value (0x8000) from the off set address. The intermediate device 6 transfers the read request after the conversion to the specified first server 4A (S146).

When receiving the transferred read request, the first server 4A returns the "Create IO CQ Command" to the storage device 8 from the Admin SQ 120 related to the real address (S148).

The storage device 8 executes the returned "Create IO CQ Command" (S150). That is, the storage device 8 registers the QID included in the "Create IO CQ Command" and the offset address of the IO CQ 132 in the internal register 220 in association with each other.

The storage device 8 issues "Command Completion" to the Admin CQ 122 of the first server 4A (S152). A destination address of the "Command Completion" is the offset address corresponding to the Admin CQ 122.

The intermediate device 6 traps the "Command Completion". The intermediate device 6 refers to the routing management table 200 and specifies that the offset value (0x8000) of the offset address, which is the destination address of the "Command Completion", is associated with the first server 4A. The intermediate device 6 converts the offset address of the "Command Completion" into a real address. The intermediate device 6 transfers the "Command Completion" after the conversion to the specified first server 4A (S154).

The driver 100 of the first server 4A dequeues the "Command Completion" from the Admin CQ 122 and completes the execution of the "Create IO CQ Command" enqueued in S122 (S156).

The driver 100 of the first server 4A and the storage device 8 execute, concerning the IO SQ 130, the same processing as S116 to S156 explained above (S160).

According to the processing explained above, the Admin CQ 122, the Admin SQ 120, the IO CQ 132, and the IO SQ 130 are generated in the memory 12A of the first server 4A. In the internal register 220 of the storage device 8, the QIDs and the offset addresses are respectively registered concerning the Admin CQ 122, the Admin SQ 120, the IO CQ 132, and the IO SQ 130.

Figure 9:
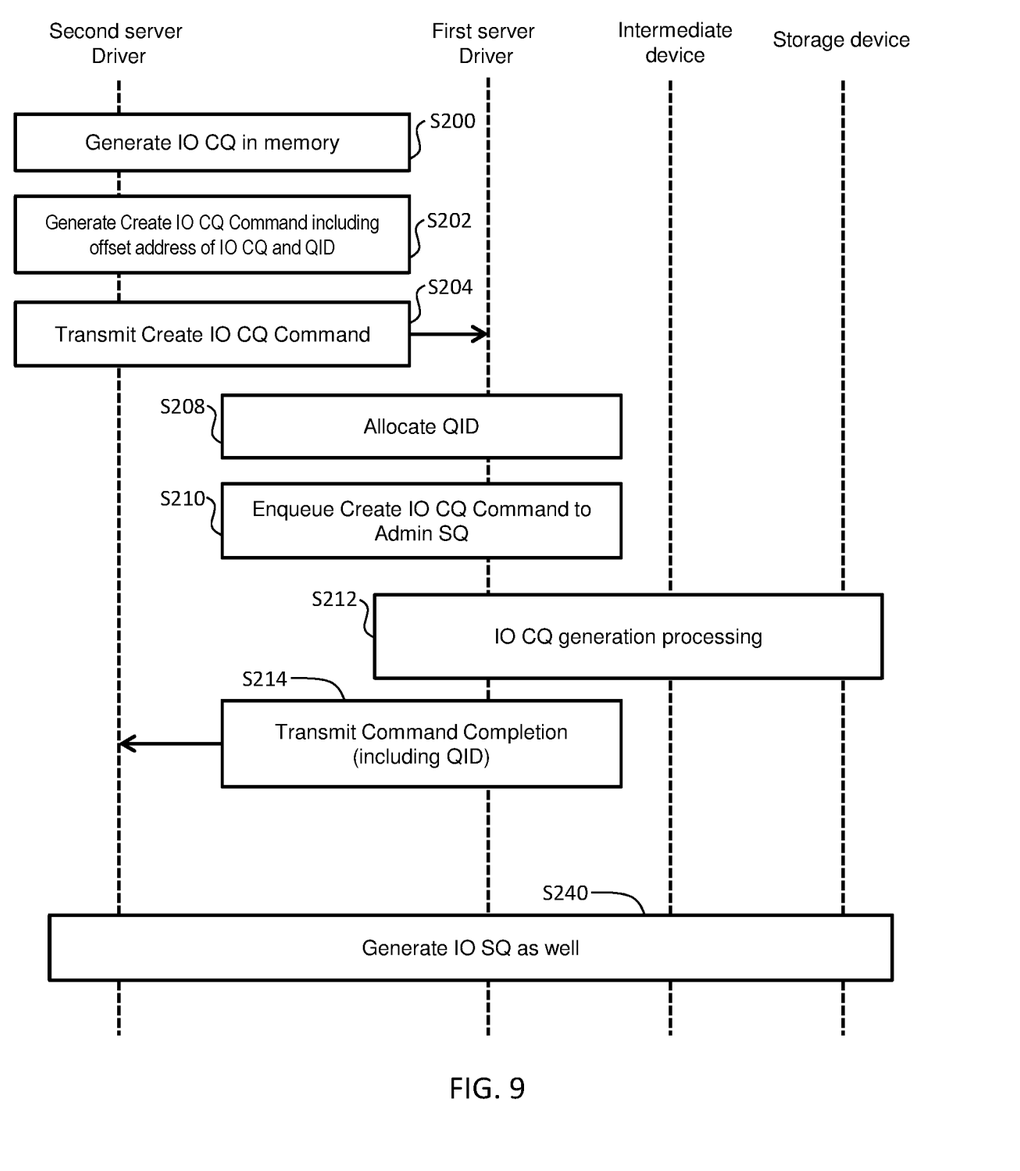
FIG. 9 is a flowchart showing an example of initial setting processing for a server other than the representative server.

FIG. 9 is a flowchart showing an example of initial setting processing for the server other than the representative server.

According to the initial setting processing, the second server 4B, which is the server other than the representative server, generates the IO SQ 130 and the IO CQ 132 in the memory 12B of the second server 4B. Details are explained below.

The driver 100 of the second server 4B generates the IO CQ 132 in the memory 12B (S200).

The driver 100 of the second server 4B adds the offset value (0x8002) associated with the second server 4B to a real address of the generated IO CQ 132 and calculates an offset address of the IO CQ 132. The driver 100 of the second server 4B generates a "Create IO CQ Command" including the offset address and a dummy QID (S202).

The driver 100 of the second server 4B transmits an execution request for the "Create IO CQ Command" generated in S202 to the first server 4A, which is the representative server, (S204).

When receiving the execution request in S204, the driver 100 of the first server 4A selects one QID from the QID free list 110. The driver 100 of the first server 4A deletes the selected QID from the QID free list 110. The driver 100 of the first server 4A replaces the dummy QID of the "Create IO CQ Command", the execution of which is requested, with the selected QID (S208).

The driver 100 of the first server 4A enqueues the "Create IO CQ Command" to the Admin SQ 120 (S210).

The driver 100 of the first server 4A, the intermediate device 6, and the storage device 8 perform the same processing as S116 to S156 shown in FIG. 8 (S212). Consequently, the offset address and the QID of the IO CQ 132 of the memory 12B of the second server 4B are registered in the internal register 220 of the storage device 8 in association with each other.

The driver 100 of the first server 4A receives "Command Completion" corresponding to the "Create IO CQ Command" from the intermediate device 6 and transmits the "Command Completion" to the driver 100 of the second server 4B (S214). The QID selected in S208 may be included in the "Command Completion". The driver 100 of the second server 4B receives the "Command Completion" and completes the processing of the "Create IO CQ Command".

The driver 100 of the second server 4B generates the IO SQ 130 as well according to the same processing as S200 to S214 explained above (S240).

According to the processing explained above, the IO CQ 132 and the IO SQ 130 are generated in the memory 12B of the second server 4B.

Figure 10:
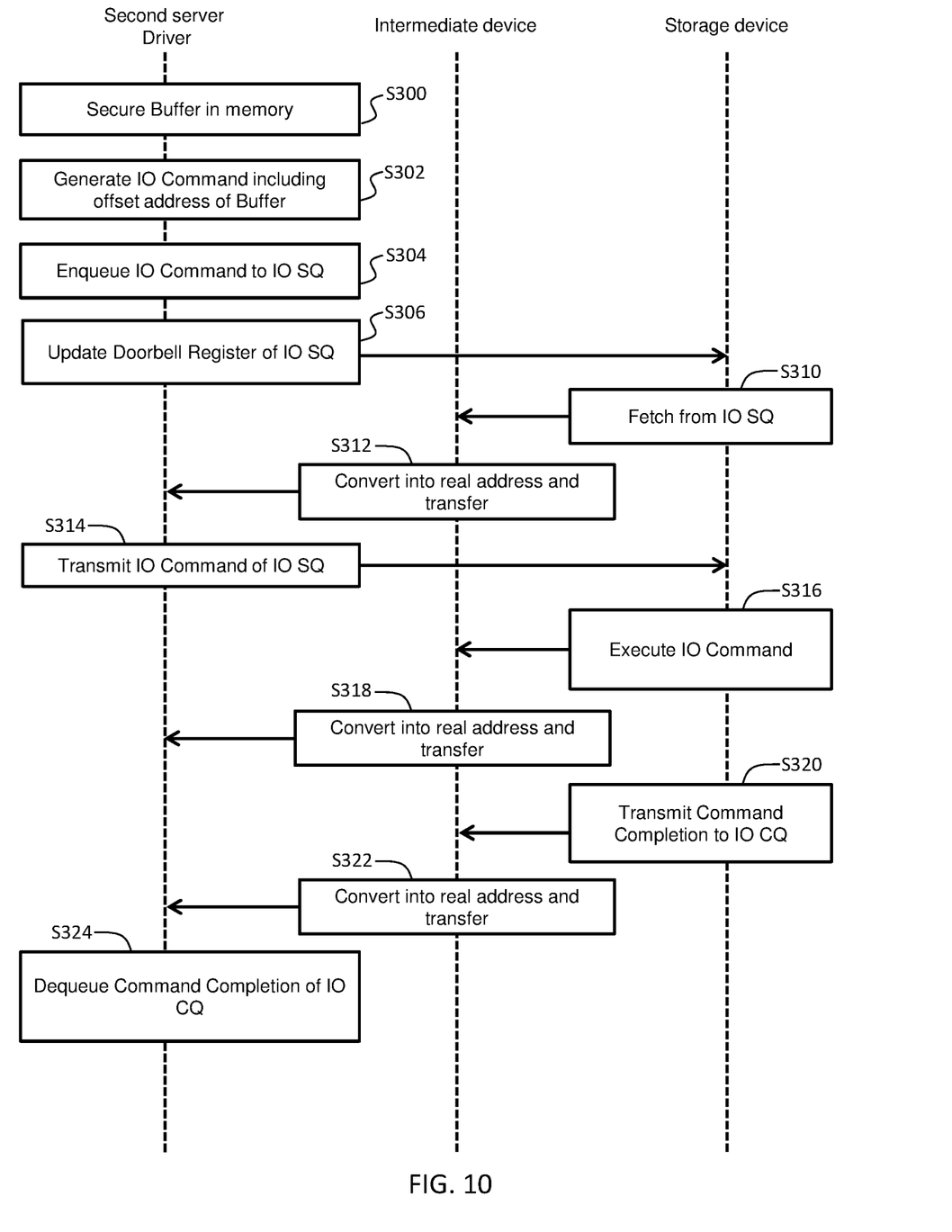
FIG. 10 is a flowchart showing an example of IO processing performed by the server on a storage device.

FIG. 10 is a flowchart showing an example of IO processing performed by the server on the storage device 8.

IO processing of the second server 4B is explained below. However, the IO processing may be the same concerning the first server 4A and the other servers.

The driver 100 of the second server 4B secures the buffer 140 in the memory 12B (S300).

The driver 100 of the second server 4B adds the offset value (0x8002) associated with the second server 4B to a real address of the secured buffer 140 and calculates an offset address of the buffer 140. The driver 100 of the second server 4B generates an "IO Command" including the offset address of the buffer 140 (S302). The "IO Command" may be a "Read Command" or a "Write Command".

The driver 100 of the second server 4B enqueues the generated "10 command" to the IO SQ 130B of the memory 12B of the second server 4B (S304).

The driver 100 of the second server 4B updates a Doorbell register related to the IO SQ 130B in the storage device 8 (S306).

When detecting the update of the Doorbell register, the storage device 8 issues a read request for fetching the "IO Command" from the IO SQ 130B (S310).

The intermediate device 6 traps the read request in S310 issued from the storage device 8. The intermediate device 6 refers to the routing management table 200 and specifies that the offset value (0x8002) of the offset address included in the read request is associated with the second server 4B. The intermediate device 6 converts the offset address into a real address. The intermediate device 6 transfers the read request after the conversion to the specified second server 4B (S312).

When receiving the transferred read request, the second server 4B returns the "10 Command" in the IO SQ 130 stored in the real address of the read request to the storage device 8 (S314).

The storage device 8 executes the returned "IO Command" (S316). That is, when the "IO Command" is the "Read Command", the storage device 8 attempts to write read data in a buffer of the offset address of the second server 4B. When the "IO Command" is the "Write Command", the storage device 8 attempts to read out write data from the buffer of the offset address of the second server 4B.

The intermediate device 6 traps an access to the offset address of the buffer 140B of the second server 4B from the storage device 8 in S316. The intermediate device 6 refers to the routing management table 200 and specifies that the offset value (0x8002) of the offset address included in the access is associated with the second server 4B. The intermediate device 6 converts the offset address included in the access into a real address. The intermediate device 6 transfers the access after the conversion to the specified second server 4B (S318). Consequently, when the "IO Command" is the "Read Command", read data is stored in the buffer 140B of the second server 4B. When the "IO Command" is the "Write Command", write data stored in the buffer 140B of the second server 4B is acquired by the storage device 8.

After completion of execution of the "IO Command", the storage device 8 issues "Command Completion" to the IO CQ 132B of the second server 4B (S320).

The intermediate device 6 traps the "Command Completion" in S320. The intermediate device 6 refers to the routing management table 200 and specifies that the offset value (0x8002) of the offset address, which is a destination address of the "Command Completion", is associated with the second server 4B. The intermediate device 6 converts the offset address, which is a destination of the "Command Completion", into a real address. The intermediate device 6 transfers the "Command Completion" after the conversion to the specified second server (S322).

The driver 100 of the second server 4B dequeues the "Command Completion" from the IO CQ 132B and completes the execution of the "IO Command" enqueued in S304 (S324).

According to the processing explained above, the second server 4B can read data from the storage device 8 and write data in the storage device 8.

The embodiment explained above is illustration for the explanation of the present invention and is not meant to limit the scope of the present invention to the embodiment. Those skilled in the art can carry out the present invention in other various forms without departing from the spirit of the present invention.

For example, an offset value may be subtracted from a real address to convert the real address into an offset address. The offset value may be added to the offset address to reset the offset address to the real address.

REFERENCE SIGNS LIST

10: computer system 4: server 6: intermediate device 8: storage device

The invention claimed is:

1. A computer system comprising:
   a storage device adapted to handle NVMe (Non-Volatile Memory Express);
   an intermediate device connected to the storage device; and
   a plurality of servers connected to the intermediate device, wherein
   each of the servers include:
   a driver related to the storage device; and
   a queue in which a command to the storage device is stored,
   the driver of the server is configured to convert an address of a memory included in the server into an offset address on the basis of an offset value corresponding to the server and store the command including the offset address in the queue;
   the storage device is configured to acquire the command including the offset address from the queue of the server and issue an access request to the offset address included in the acquired command, and
   the intermediate device is configured to trap the access request issued from the storage device, specify a server on the basis of the offset address included in the trapped access request, reset the offset address to the address of the memory included in the server on the basis of an offset value corresponding to the specified server, and transfer the access request including the reset address to the specified server.

2. A computer system according to claim 1, wherein a driver of a first server among the plurality of servers is configured to generate an Admin queue in a memory included in the first server and convert an address related to the generated Admin queue into an offset address on the basis of an offset value corresponding to the first server.

3. A computer system according to claim 2, wherein the driver of the first server is configured to generate an IO queue in the memory included in the first server, convert an address related to the generated IO queue into an offset address on the basis of the offset value corresponding to the first server, and store, in the Admin queue, an IO queue generation command including the converted offset address.

4. A computer system according to claim 3, wherein
   a driver of a second server among the plurality of servers is configured to generate an IO queue in a memory included in the second server, convert an address related to the generated IO queue into an offset address on the basis of an offset value corresponding to the second server, and transmit an IO queue generation command including the converted offset address to the first server, and
   the driver of the first server is configured to store, in the Admin queue, the IO queue generation command received from the second server.

5. A computer system according to claim 4, wherein
the first server has unallocated queue ID management information for managing an unallocated queue ID, and
the driver of the first server is configured to allocate a queue ID included in the unallocated queue ID management information to the IO queue generation command received from the second server and notify the allocated queue ID to the second server.

6. A computer system according to claim 1, wherein the intermediate device has routing management information in which the plurality of servers and a plurality of offset values are respectively associated.

7. A computer system according to claim 1, wherein the offset value is a value for converting predetermined bits from a top of an address space of the memory.

8. A storage control method in a computer system including:
   a storage device adapted to handle NVMe (Non-Volatile Memory Express);
   an intermediate device connected to the storage device; and
   a plurality of servers connected to the intermediate device, each of the servers including:
      a driver related to the storage device; and
      a queue in which a command to the storage device is stored,
   the storage control method comprising:
   the driver of the server converting an address of a memory included in the server into an offset address on the basis of an offset value corresponding to the server and storing the command including the offset address in the queue;
   the storage device acquiring the command including the offset address from the queue of the server and issue an access request to the offset address included in the acquired command; and
   the intermediate device trapping the access request issued from the storage device, specifying a server on the basis of the offset address included in the trapped access request, resetting the offset address to the address of the memory included in the server on the basis of an offset value corresponding to the specified server, and transferring the access request including the reset address to the specified server.

* * * * *